(12) United States Patent
Kahn et al.

(10) Patent No.: US 9,451,095 B2
(45) Date of Patent: Sep. 20, 2016

(54) CHARGING IN A SOFTWARE DEFINED NETWORK

(71) Applicant: Alcatel-Lucent USA Inc., Murray Hill, NJ (US)

(72) Inventors: Colin L. Kahn, Murray Hill, NJ (US); Harish Viswanathan, Murray Hill, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 28 days.

(21) Appl. No.: 14/307,007

(22) Filed: Jun. 17, 2014

(65) Prior Publication Data
US 2015/0365537 A1 Dec. 17, 2015

(51) Int. Cl.
| | | |
|---|---|---|
| *H04L 12/14* | (2006.01) | |
| *H04M 15/00* | (2006.01) | |
| *H04L 12/26* | (2006.01) | |
| *H04L 29/06* | (2006.01) | |
| *H04L 12/24* | (2006.01) | |

(52) U.S. Cl.
CPC .......... *H04M 15/58* (2013.01); *H04L 12/1407* (2013.01); *H04L 41/0893* (2013.01); *H04L 43/026* (2013.01); *H04L 63/00* (2013.01); *H04M 15/64* (2013.01); *H04M 15/65* (2013.01); *H04L 12/1432* (2013.01); *H04L 12/1435* (2013.01); *H04L 12/1439* (2013.01); *H04L 12/1467* (2013.01); *H04L 43/16* (2013.01)

(58) Field of Classification Search
CPC . H04M 15/66; H04M 2215/44; H04L 12/14; H04L 12/1403; H04L 12/1407; H04W 4/24
USPC ........................................................ 455/408
See application file for complete search history.

(56) References Cited

U.S. PATENT DOCUMENTS

| | | | | |
|---|---|---|---|---|
| 2002/0165807 | A1* | 11/2002 | Tadano | G06Q 20/145 705/32 |
| 2002/0181447 | A1* | 12/2002 | Hashizume | H04L 12/14 370/352 |
| 2010/0043053 | A1* | 2/2010 | Wei | H04L 47/10 726/1 |
| 2011/0225306 | A1* | 9/2011 | Delsesto | H04L 29/12896 709/227 |
| 2012/0054079 | A1* | 3/2012 | Hayashi | G06Q 30/04 705/34 |
| 2012/0257529 | A1* | 10/2012 | Ehara | H04L 12/66 370/252 |
| 2013/0148498 | A1* | 6/2013 | Kean | H04L 41/0893 370/230 |
| 2013/0343295 | A1* | 12/2013 | Deo | H04W 28/16 370/329 |
| 2014/0256343 | A1* | 9/2014 | Shaikh | H04W 28/22 455/452.2 |
| 2015/0236914 | A1* | 8/2015 | Woods | H04L 41/0893 370/230 |

OTHER PUBLICATIONS

International Search Report and Written Opinion correlating to PCT/US2015/034184 dated Aug. 10, 2015, 13 pages.

(Continued)

*Primary Examiner* — Nathan Taylor
(74) *Attorney, Agent, or Firm* — Davidson Sheridan LLP

(57) ABSTRACT

A controller includes control plane charging system to configure data plane charging system in a plurality of switches to gather charging information for user flows and provide the charging information to the controller. The data plane charging system in a selected switch of the plurality of switches can be configured to gather charging information for a user flow and autonomously provide the charging information to the controller.

19 Claims, 9 Drawing Sheets

(56) References Cited

OTHER PUBLICATIONS

Arsany Basta et al., "A Virtual SDN-enabled LTE EPC Architecture: a case study for S-/P-Gateways functions", 2013 IEEE SDN for Future Networks and Services, Nov. 11, 2013, 8 pages.

Li Erran Li et al., "Toward Software-Defined Cellular Networks", 2012 European Workshop on Software Defined Networking, Oct. 25, 2012, 6 pages.

Julius Mueller, "Chair for Next Generation Networks (AV) TU Berlin; TUB-FhG-OpenFlow", European Telecommunications Standards Institute (ETSI), Mar. 20, 2013, 16 pages.

"Technical Specification Group Services and System Aspects; Telecommunication Management; Charging Management; Charging Architecture and Principles", 3 GPP TS 32.240 V 12.3.0, 2013, 51 pages.

"Technical Specification Group Services and System Aspects; Telecommunication Management; Charging Management; Packet Switched (PS) Domain Charging", 3 GPP TS 32.251 V 12.5.0, 2014, 128 pages.

* cited by examiner

CHARGING IN A SOFTWARE DEFINED NETWORK

BACKGROUND

1. Field of the Disclosure

The present disclosure relates generally to communication networks and, more particularly, to software defined networking.

2. Description of the Related Art

Routers in a conventional network include control plane functionality and data plane functionality. The control plane functionality configures a flow table that indicates how to process incoming packets and the data plane functionality processes the incoming packets, e.g., based on rules defined in the flow table. Software defined networking (SDN) differs from conventional router networks in that the control plane functionality is implemented in a central controller used to control a plurality of switches that implement data plane functionality. Consolidating the control plane functionality for a group of switches into the central controller allows an SDN network to support dynamic resource allocation and may significantly reduce the costs associated with establishing and maintaining the SDN network when compared to a conventional network. SDN also allows for global optimization that is not possible with local routing protocols.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
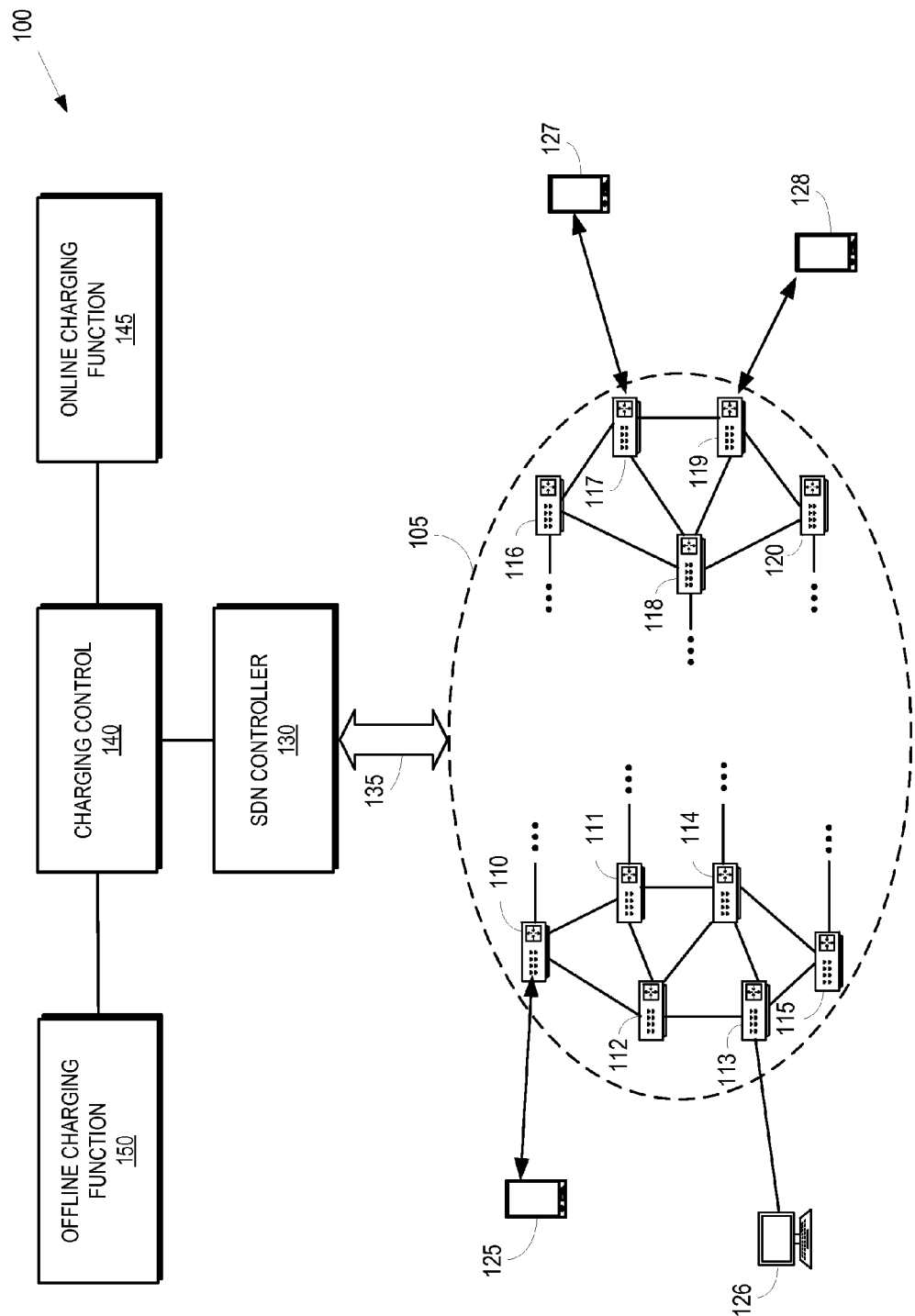
FIG. 1 is a block diagram of a communication system according to some embodiments.

Currently-used SDN protocols like OpenFlow were defined to support wired networks such as networks that are implemented in data centers. Consequently, the SDN protocols do not provide the control aspects for charging in mobile cellular networks, a mechanism for monitoring data used for on-line or off-line charging, or messaging to convey the charging information to the appropriate charging function. Moreover, the way charging is implemented in wireless networks is incompatible with SDN principles because both control plane functionality and data plane functionality for the charging mechanism are implemented in a single entity. For example, a packet data network (PDN) gateway (PGW) may implement a charging trigger function that includes data plane functionality to monitor user traffic and gather metrics associated with a data flow. The charging trigger function also implements control plane functionality to receive accounting metrics collected by the data plane functionality, associate the metrics with a user, determine the occurrence of chargeable events, and forward the chargeable events towards a charging data function (for off-line charging) or an on-line charging function. Implementing a conventional charging trigger function in an SDN switch would therefore violate the basic premise of SDN, which is that all control plane functions are consolidated in the central controller. Using a conventional charging trigger function would also require developing specialized wireless SDN switches, which is contrary to the SDN goal of basing the network on generic, programmable switches that may be used for both wireless and wireline applications.

On-line and off-line charging can be supported in SDN networks by implementing data plane charging functionality in each of a plurality of switches associated with an SDN controller and implementing control plane charging functionality for the plurality of switches in a charging control application associated with the SDN controller. Embodiments of the switches may include a flow table that has entries to specify the rules or filters that may be applied to the user flows. The flow table entries can be programmed by the SDN controller to monitor traffic for charging purposes, in addition to performing normal switch processing such as forwarding incoming packets to the appropriate outgoing port. For example, the SDN controller may select one of the plurality of switches to monitor a user flow and gather charging information for the user flow. The SDN controller may instruct the selected switch to create a flow table entry corresponding to the user flow. The instructions from the SDN controller include rules that are executed according to the flow table entry to count packets in the user flow, count bytes, add timestamps, or gate the user flow after a number of bytes or packets. The SDN controller may also program the switch to periodically report statistics for the flow to the SDN controller, which may use the reported statistics to provide charging information to charging functions in the network via the charging control application. Embodiments of the SDN controller and associated charging control application may also store state information and metadata for associating the flow table entries with an application, a user, a device, a service, or the like, as well as providing an interface to downstream charging functions.

FIG. 1 is a block diagram of a communication system 100 according to some embodiments. The communication system 100 includes a switch network 105 made up of a plurality of interconnected switches 110, 111, 112, 113, 114, 115, 116, 117, 118, 119, 120 (collectively referred to herein as "the switches 110-120"). Some embodiments of the switches 110-120 may provide wired or wireless connectivity to user equipment 125, 126, 127, 128 (collectively referred to as "user equipment 125-128"). For example, the switch 110 may be a wireless switch that can provide wireless connectivity to user equipment 125 and the switch 113 may be a wired switch that can provide wired connectivity to user equipment 126. The user equipment 125-128 may include relatively mobile devices such as cell phones, smart phones, tablet computers, laptops, and the like, as well as relatively immobile devices such as desktop computers. The user equipment 125-128 may also include devices such as sensors that are configured for machine-to-machine (M2M) communication over the switch network 105.

Some embodiments of the communication system 100 implement software defined networking (SDN). As used herein, the term "software defined networking" refers to a network in which the control plane functionality for a plurality of switches is separated from the data plane functionality and consolidated in a central entity. As used herein, the term "control plane" refers to the portion of the architecture that configures a map of the network, which is represented in one or more flow tables that define what each switch is to do with incoming packets. For example, control plane functionality configures a flow table that defines outgoing ports for different incoming packets, filters of incoming packets, and the like. As used herein, the term "data plane" refers to the portion of the architecture that receives and processes packets as they arrive at the switch according to instructions provided by the control plane. For example, data plane functionality may use information stored in the flow table by the control plane functionality to decide whether to forward an incoming packet to one or more other switches via one or more ports or to filter the incoming packet. The data plane may also be referred to as the forwarding plane, the transport plane, the data bearer plane, or other descriptive terms.

A controller 130 includes a control plane system that implements control plane functionality for the switch network 105. The controller 130 exchanges information with the switches 110-120 in the switch network 105. Some embodiments of the controller 130 may be referred to as an SDN controller 130. In the interest of clarity, the wired or wireless connections between the SDN controller 130 and the switches 110-120 in the switch network 105 are collectively indicated by the double-headed arrow 135. Some embodiments of the communication system 100 may include other switch networks that are interconnected with the switch network 105 and which may have their own SDN controllers that can communicate with the SDN controller 130 shown in FIG. 1.

The SDN controller 130 determines the map for different routes through the switch network 105 and provides the routing information to the switches 110-120, e.g., in the form of information that can be used to populate flow tables in the switches 110-120. Some embodiments of the SDN controller 130 may provide the network map information to some or all of the switches 110-120 in response to user equipment 125-128 initiating communication with other user equipment 125-128. For example, the user equipment 125 may provide messaging to establish a communication link with user equipment 128. The control plane system in the SDN controller 130 may then determine one or more routes through the switches 110-120 and provide routing information to a relevant subset of the switches 110-120. For example, the control plane system may determine that an optimal route from the user equipment 125 to the user equipment 128 includes the switch 110, the switch 111, the switch 118, and the switch 119. The control plane system may therefore provide routing information to populate the flow tables in the switches 110, 111, 118, 119 so that incoming packets from the user equipment 125 that are destined for the user equipment 128 are forwarded along the correct path through the switches 110-120. Some embodiments of the SDN controller 130 may pre-provision routing information to the flow tables in the switches 110-120.

The control plane system in the SDN controller 130 may also be used to configure data plane systems that implement data plane functionality in the switches 110-120 to gather charging information associated with users of the user equipment 125-128. Some embodiments of the control plane systems may provide information to configure entries in the flow tables to monitor, collect, or store charging information associated with user flows for the user equipment 125-128. For example, in response to the user equipment 125 initiating a user flow with the switch 110, the control plane system may select the switch 110 to gather charging information associated with user flows for the user equipment 125, such as packet counts, byte counts, or elapsed time associated with the user flow. The control plane system may then provide information to configure the data plane system in the switch 110, e.g., by programming entries in a flow table together with the requested information. The control plane system may also configure the data plane system in the switch 110 to autonomously report the data at specified time intervals or when a specified usage threshold has been exceeded.

The communication system 100 also includes a charging control application 140 that facilitates interaction between the SDN controller 130 and charging entities such as an online charging system 145 or an off-line charging system 150. As used herein, the term "online charging system" refers to an entity or group of entities that allow communication service providers to authorize users and charge them in real time based on service usage. Online charging can affect, in real-time, the service rendered and there may be a direct interaction between the charging mechanism and bearer/session/service control function. Some embodiments of the online charging system 145 may therefore monitor resource usage and charge users in real time, e.g., by debiting an account that may indicate a number of packets, bytes, a time interval, or other resource that a user is allowed to consume. Users may be prevented from continuing to use the system when the resources available in their account are exhausted. As used herein, the term "off-line charging system" refers to an entity or group of entities that allow communication service providers to charge users for service usage in non-real-time, e.g., after a call or data transfer is complete. Charging information does not affect, in real-time, the service rendered during offline charging and charging information is gathered for post service billing. The charging control application 140 may be implemented as a standalone entity (as shown in FIG. 1) or it may be integrated within the SDN controller 130.

The charging control application 140 may generate information that can be used to configure the data plane system in the switches 110-120. Some embodiments of the charging control application 140 identify or configure a flow filter that defines the charging information that is collected for a user flow. The charging control application 140 may define the flow filter based on state information or metadata such as an application associated with the user flow, a subscriber or user of the user flow, a quality of service (QoS) for the user flow, or other flow matching criteria. For example, all bytes or packets associated with a QoS priority level for a video flow may be matched by the flow filter and therefore counted for charging purposes. For another example, the flow filter may indicate that no charging information needs to be gathered for a user flow provided by a streaming service such as Netflix because subscribers to the streaming service may be authorized to stream an unlimited number of movies or television shows. Some embodiments of the charging control application 140 may generate or access threshold information indicating how many packets a user flow is authorized to consume, how many bytes a user flow is authorized to consume, or how much time a user flow is authorized to consume. The charging information may be generated at a charging granularity that is specified by the flow filter. For example, the charging granularity may be specified by a number of bytes, a number of packets, or a time interval that may be purchased as a block for a single fee. Multiple flow filters may be defined for a user that is accessing multiple services and consequently is associated with multiple flows.

The charging control application 140 may provide the charging information to the SDN controller 130 for configuring the data plane system in the switches 110-120. The SDN controller 130 may use the charging information to configure the data plane system, e.g., by programming entries in flow tables in the switches 110-120 to reflect threshold values of the packets, bytes, or time. For example, the SDN controller 130 may program entries in the flow tables to collect information indicated in the flow filter created by the charging control application 140. The SDN controller 130 may provide the data gathered by the data control systems in the switches 110-120 to the charging control application 140, which may generate messages and reports that are provided to the online charging system 145 or the off-line charging system 150 to facilitate charging the user for resource consumption in the communication system 100.

Figure 2:
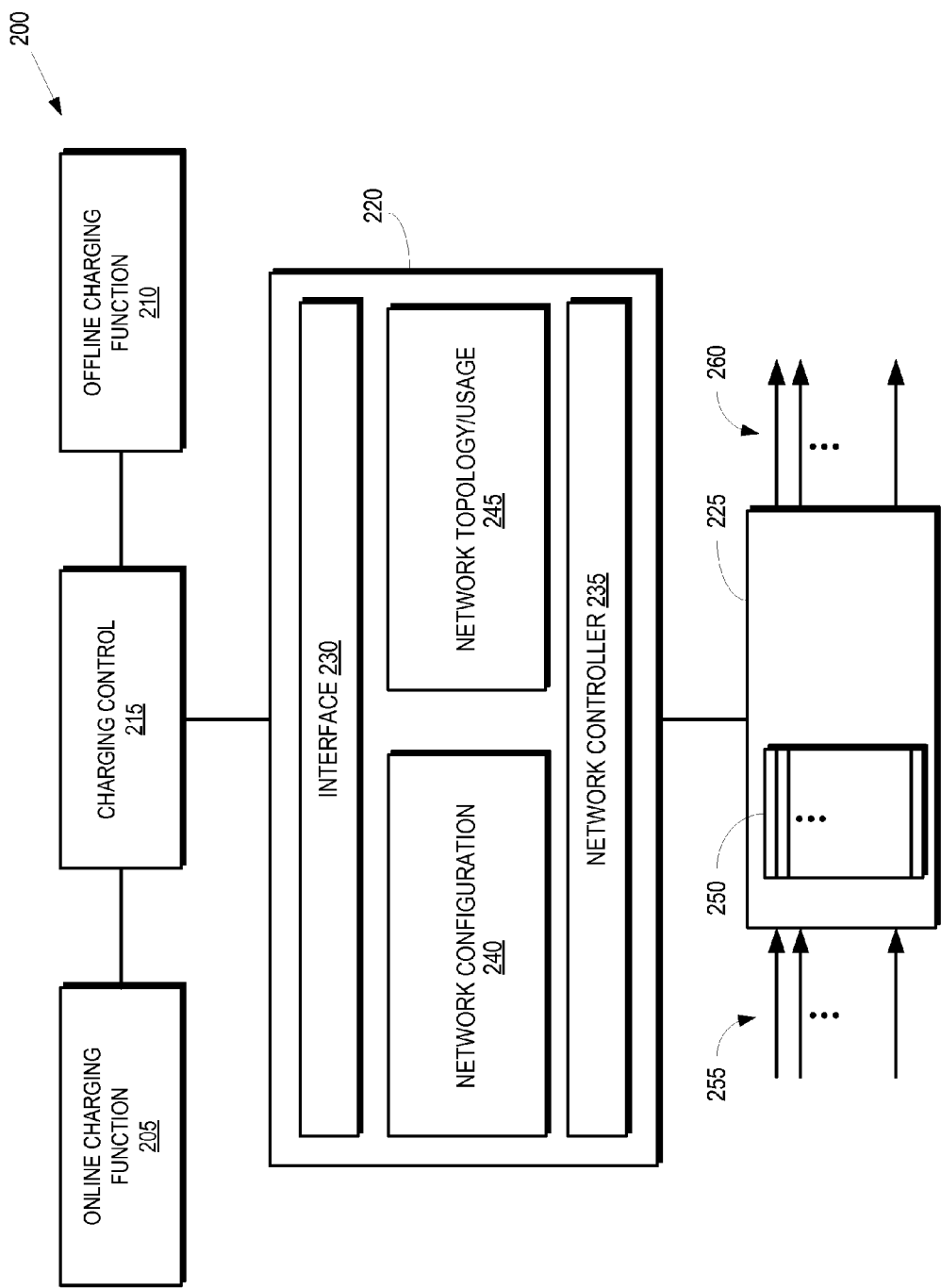
FIG. 2 is a block diagram of a portion of a communication system according to some embodiments.

FIG. 2 is a block diagram of a portion of a communication system 200 according to some embodiments. The portion of the communication system 200 includes an online charging function 205, an off-line charging function 210, a charging control application 215, an SDN controller 220, and a switch 225, which may correspond to the online charging system 145, the off-line charging system 150, the charging control application 140, the SDN controller 130, and one of the switches 110-120 shown in FIG. 1. As discussed herein, control plane functionality is consolidated in the SDN controller 220 and data plane functionality is implemented in the switch 225.

The SDN controller 220 includes an interface 230 for communication between the charging control application 215 and the SDN controller 220. The SDN controller 220 also includes a network controller 235 that is used to provide control information to switch 225 and to receive statistics or resource usage alerts from the switch 225. The SDN controller 220 also includes network configuration functionality 240 that may be used to implement network configuration policies or apply network configuration templates. The SDN controller 220 also includes network topology/usage functionality 245 that is used to configure or modify the topology of the switch network that includes the switch 225 and monitor resource utilization in the switch network. The network controller 235 the network configuration functionality 240, or the network topology/usage functionality may be part of the control plane functionality of the SDN controller 220.

The switch 225 includes a flow table 250 that includes one or more entries that can be programmed to indicate how incoming packets are to be processed, filtered, or potentially forwarded. The entries may match the charging granularity for the corresponding flow. Entries in the flow table 250 may also be programmed to gather charging information and provide the charging information to the SDN controller 220. Each entry in the flow table 250 corresponds to one of the incoming user flows 255 and may correspond to one or more of the outgoing user flows 260. For example, an entry in the flow table 250 may be programmed to forward packets from an incoming user flow 255 to an outgoing port corresponding to an outgoing user flow 260. For another example, an entry of the flow table 250 may be programmed to filter packets or gate one of the incoming user flows 255 so that the filtered or gated packets are not provided to an outgoing port.

The SDN controller 220 can program or configure entries in the flow table 250 based on information provided by the charging control application 215. For example, the charging control application 215 may store state information or metadata associated with the user flows. The state information or metadata may include information identifying an application associated with the user flow, a subscriber or user associated with the user flow, a quality-of-service (QoS) for the user flow, flow matching criteria to identify user flows, and the like. In response to the SDN controller 220 requesting information to configure an entry in the flow table 250, the charging control application 215 may use the flow matching criteria to identify the user flow and provide user flow configuration information such as authorization to allow the user flow to transmit or receive data using the switch 225, parameters of a flow filter, or one or more thresholds for packet counts, byte counts, or an elapsed time for the user flow. The SDN controller 220 can then provide signaling to the switch 225 so that the switch 225 can program an entry in the flow table 250 to gather charging information, authorize the user flow to consume resources up to one or more of the threshold values, and provide the gathered charging information to the SDN controller 220 autonomously or at specified time intervals. For example, the switch 225 may periodically provide reports to the SDN controller 220 with a periodicity that is defined by the SDN controller 220.

Once entries in the flow table 250 have been configured, the entries can be used to filter packets in the incoming user flows 255, forward packets from the incoming user flows 255 to the outgoing user flows 260, gather charging information for the user flows 255, 260, provide the charging information to the SDN controller 220, and the like. Some embodiments of the switch 225 may autonomously and periodically report statistics from the entries in the flow table 250 to the SDN controller 220 for charging purposes. Some embodiments of the switch 225 may also provide resource usage alerts in response to resource usage approaching or exceeding a corresponding threshold. For example, a resource usage alert may be provided to the SDN controller 220 in response to a byte count associated with an incoming user flow 255 equaling or exceeding a byte count threshold. The switch 225 may gate the incoming user flow 255 in response to the byte count exceeding the byte count threshold and stop forwarding outgoing packets until further authorization is received from the SDN controller 220. Alternatively, the switch 225 may continue to forward packets until the SDN controller 220 sends the switch 225 instructions to stop forwarding outgoing packets because the SDN controller 220, after interacting with the charging control application 215 has determined that further data transmission is not authorized.

Figure 3:
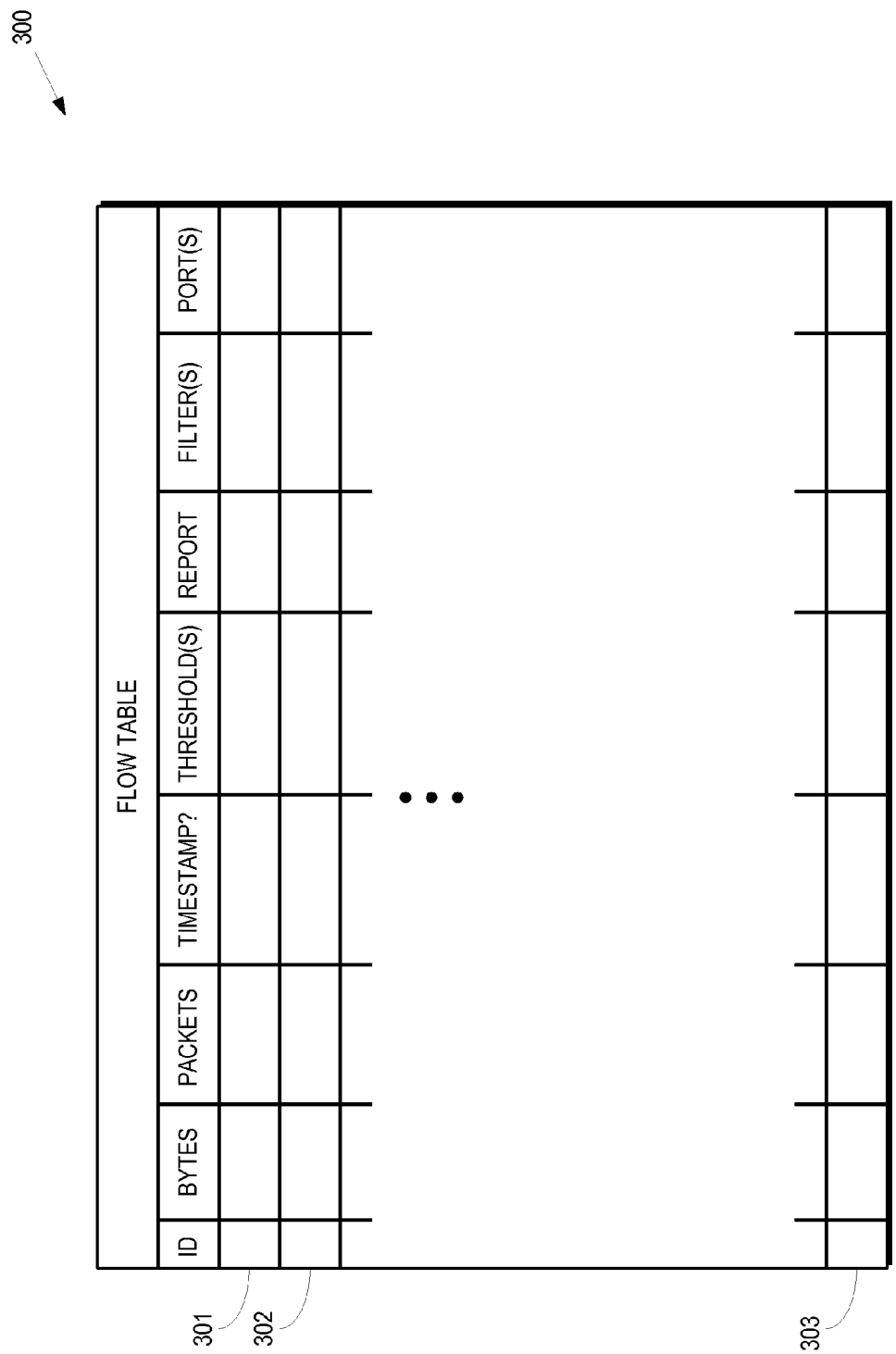
FIG. 3 is a diagram of a flow table according to some embodiments.

FIG. 3 is a diagram of a flow table 300 according to some embodiments. The flow table 300 may be part of the data plane functionality of a switch such as the switches 110-120 shown in FIG. 1. The flow table 300 may also be implemented as the flow table 250 shown in FIG. 2. The flow table 300 includes entries 301, 302, 303 (collectively referred to as "the entries 301-303") that can be associated with corresponding user flows. The entries 301-303 in the flow table 300 can be programmed or configured by control plane functionality such as the SDN controller 130 shown in FIG. 1 or the SDN controller 220 shown in FIG. 2.

Some embodiments of the entries 301-303 in the flow table 300 include a plurality of fields that can be populated using information provided by the control plane functionality in the SDN controller. For example, the entries 301-303 in the flow table 300 may include information identifying the user flow (ID), fields for storing the accumulated byte counts (BYTES) or packet counts (PACKETS) for the user flow, and a field (TIMESTAMP?) indicating whether timestamps should be applied to the user flow, e.g., to indicate an elapsed time associated with the user flow. Some embodiments of the entries 301-303 in the flow table 300 also include one or more fields (THRESHOLD(S)) for storing thresholds for the byte counts, packet counts, or elapsed times associated with the user flow. Entries 301-303 may also include a field (REPORT) to hold information that indicates whether reports are to be provided autonomously to the SDN controller, a time interval for reporting, and the like. Some embodiments of the entries 301-303 in the flow table 300 include one or more fields (FILTER(S)) that include information used to filter packets in the user flow and one or more fields (PORT(S)) that may indicate the outgoing ports used to forward packets from the incoming user flow to an outgoing user flow.

Figure 4:
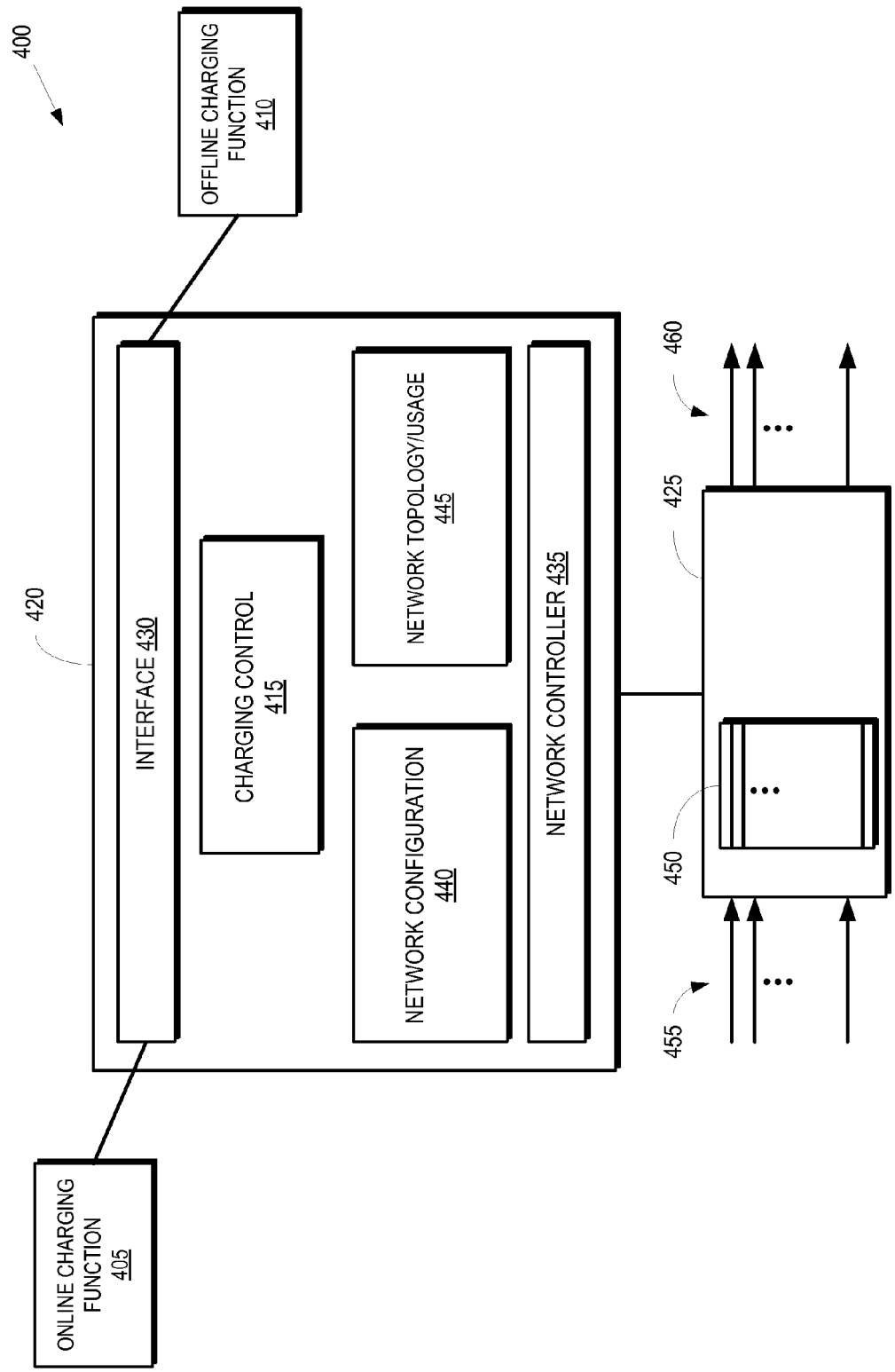
FIG. 4 is a block diagram of a portion of a communication system according to some embodiments.

FIG. 4 is a block diagram of a portion of a communication system 400 according to some embodiments. The portion of the communication system 400 includes an online charging function 405, an off-line charging application 410, a charging control application 415, an SDN controller 420, and a switch 425, which may correspond to the online charging system 145, the off-line charging system 150, the charging control application 140, the SDN controller 130, and one of the switches 110-120 shown in FIG. 1. The SDN controller 420 includes an interface 430, a network controller 435, network configuration functionality 440, and network topology/usage functionality 445, which may correspond to similar elements in FIG. 2. The switch 425 includes a flow table 450 that includes one or more entries that can be programmed to indicate how incoming packets are to be processed, filtered, or forwarded. Entries in the flow table 450 may also be programmed to gather charging information and provide the charging information to the SDN controller 420. Each entry in the flow table 450 corresponds to one of the incoming user flows 455 and may correspond to one or more of the outgoing user flows 460, as discussed herein with regard to FIG. 2.

The portion of the communication system 400 shown in FIG. 4 differs from the portion of the communication system 200 shown in FIG. 2 by implementing the charging control function 415 within the SDN controller 420 instead of implementing the charging control application 215 external to the SDN controller 220. Consequently, the interface 430 provides an interface between the charging control function 415 and the online charging function 405 or the off-line charging function 410.

Figure 5:
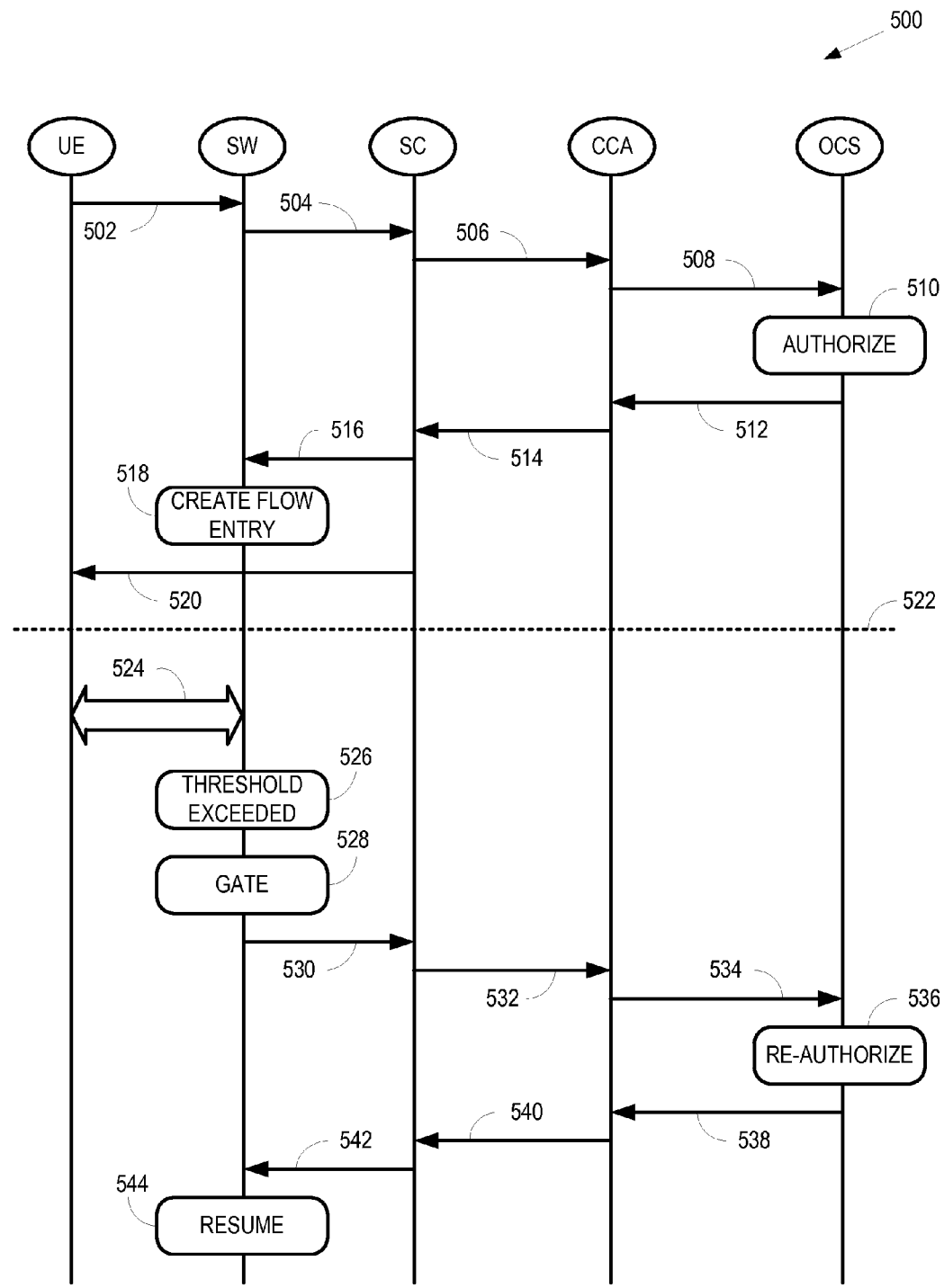
FIG. 5 is a flow diagram of a first method for online charging associated with a user flow in an SDN network according to some embodiments.

FIG. 5 is a flow diagram of a first method 500 for online charging associated with a user flow in an SDN network according to some embodiments. The SDN network includes a plurality of switches that implement data plane functionality and an SDN controller (SC) that implements control plane functionality for the plurality of switches. The SDN network also includes a charging control application (CCA) that may be implemented externally to the SC or as an integrated portion of the SC, as discussed herein. The SDN network further includes an online charging system (OCS). The method 500 may therefore be implemented in embodiments of the communication systems 100, 200, 400 shown in FIG. 1, FIG. 2, or FIG. 4, respectively.

The method 500 may begin in response to user equipment (UE) transmitting (at 502) a request to a switch (SW) to initiate a user flow in the SDN network. The request may be forwarded to the SC at 504, the CCA at 506, and the OCS at 508. In response to receiving the request, the OCS may authorize the UE for communication in the SDN network at 510. Authorization may include verifying subscription or payment information associated with the UE and determining resource usage thresholds such as thresholds for the maximum number of bytes that can be consumed by the UE during the user flow, the maximum number of packets that can be consumed by the UE for the user flow, or the maximum duration of the user flow. Authorization information including any resource usage thresholds may be provided to the CCA at 512, which may use the authorization information to generate appropriate flow filters for the user flow. The CCA forwards the authorization information, as well as other information such as flow filter parameters, to the SC at 514.

The SC uses the information provided by the CCA to generate information that is used to configure the SW to collect and report the charging information associated with the user flow. The information is provided to the SW at 516 and then the SW uses the information to create a flow entry in a flow table. The flow entry is associated with the user flow and can be programmed to collect information such as byte counts, packet counts, or elapsed time, as well as establishing thresholds for gating the user flow if the thresholds are exceeded, as discussed herein. The SC may signal the UE at 520 to indicate that the requested user flow has been approved. At this point, indicated by the line 522, the UE is authorized for communication in the SDN network and may begin transmitting or receiving packets.

The UE transmits or receives user flow packets from the SW at 524. The SW monitors the transmitted packets and received packets and gathers charging information based on the user flow's entry in the flow table. For example, the SW may count the bytes, count the packets, or measure the elapsed time for the user flow. The information may be stored in a field of the flow table and reports based on the gathered information may be periodically or autonomously reported to the SC, as discussed herein. At 526, the SW determines that one or more of the resource usage thresholds indicated by the entry in the flow table has been exceeded. The SW may gate the user flow (at 528) in response to the resource usage thresholds being exceeded so that the UE is unable to transmit over the SDN network or receive packets from the SDN network. In some embodiments, the UE may be able to transmit packets to the SW and the SW may store the packets pending re-authorization. Some embodiments of the SW may also store packets received from the SDN network for transmission to the UE pending re-authorization. In some embodiments, the SW may continue to transmit packets until an instruction has been received from the SC to gate the flow. In this case the SW may reset its count, continue to monitor transmitted and received packets, and generate a subsequent report to the SC when the resource usage threshold is again exceeded. This approach may prevent or at least reduce the likelihood of interruptions in the user flow while reauthorization is determined between the SC, CCA and OCS.

The SW may also transmit a request for re-authorization of the UE to the SC at 530. The request may be forwarded to the CCA at 532 and to the OCS at 534. In response to receiving the request, the OCS may re-authorize the UE for communication in the SDN network at 536. Re-authorization may include verifying subscription or payment information associated with the UE and determining new resource usage thresholds such as updated thresholds for the maximum number of bytes that can be consumed by the UE during the user flow, the maximum number of packets that can be consumed by the UE during the user flow, or the maximum duration of the user flow. Re-authorization information including the updated resource usage thresholds may then be provided to the CCA at 538, which may forward the authorization information (potentially with updated flow filter parameters) to the SC at 540. In some embodiments, the OCS may not re-authorize the UE and may instead provide information indicating that the user flow with the UE is to be terminated.

If the OCS re-authorizes the UE, the SC uses the authorization information provided by the OCS to generate updated information that is used to reconfigure thresholds used by the SW, as well as to instruct the SW to continue to collect and report the charging information associated with the requesting user flow. The information is provided to the SW at 542 and the SW uses the information to update the thresholds (or other information) in the flow entry associated with the user flow. At this point, the UE is re-authorized for communication in the SDN network and may resume transmitting or receiving packets. In some embodiments, the UE may be unaware of the re-authorization process and the SW may resume forwarding stored packets received from the UE and transmitting stored packets received from the network to the UE. If the OCS does not re-authorize the UE, the user flow with the UE may be terminated.

Figure 6:
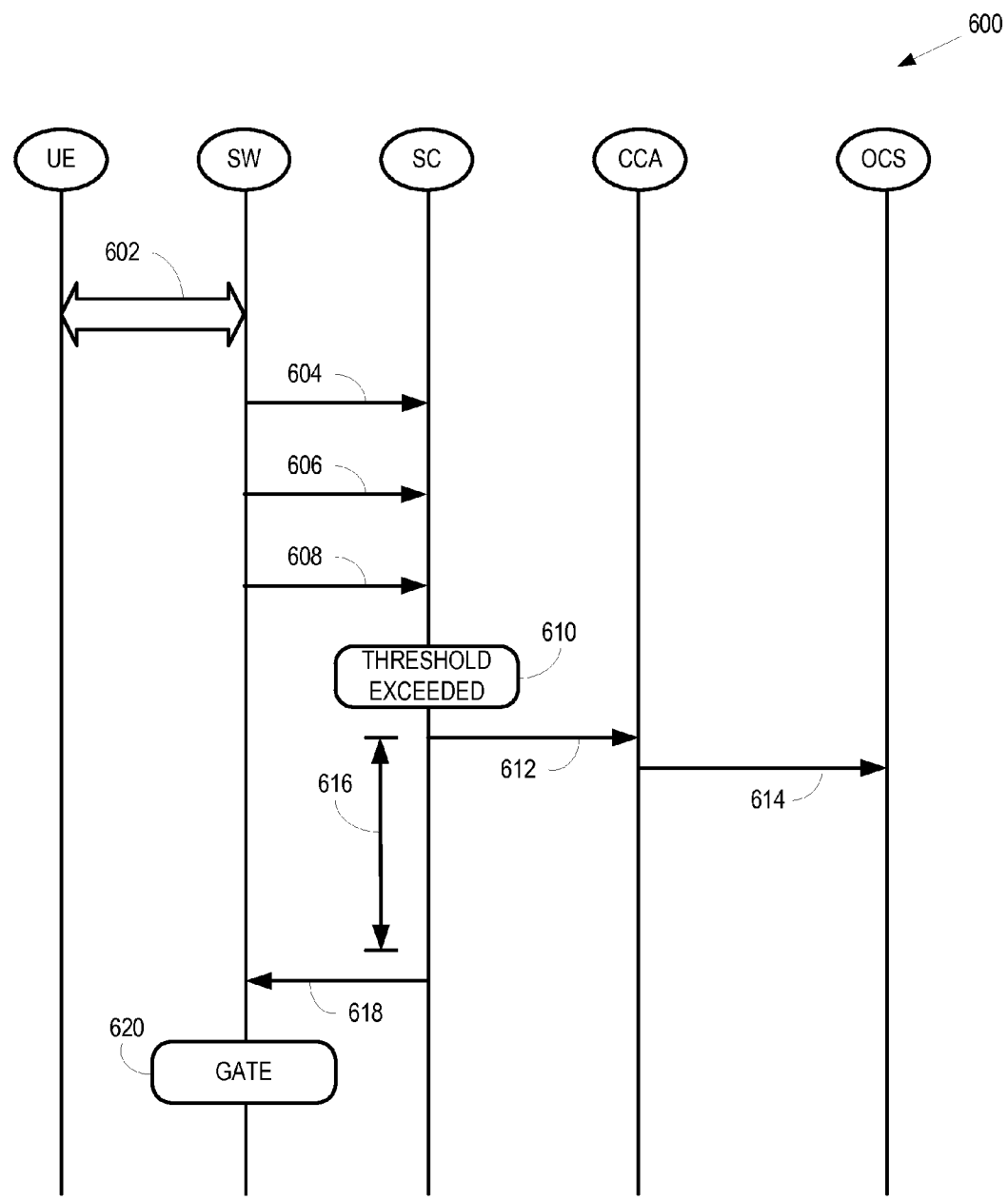
FIG. 6 is a flow diagram of a second method for online charging associated with a user flow in an SDN network according to some embodiments.

FIG. 6 is a flow diagram of a second method 600 for online charging associated with a user flow in an SDN network according to some embodiments. The SDN network includes a plurality of switches that implement data plane functionality and an SDN controller (SC) that implements control plane functionality for the plurality of switches. The SDN network also includes a charging control application (CCA) that may be implemented externally to the SC or as an integrated portion of the SC, as discussed herein. The SDN network further includes an online charging system (OCS). The method 600 may therefore be implemented in embodiments of the communication systems 100, 200, 400 shown in FIG. 1, FIG. 2, or FIG. 4, respectively.

In the method 600, entries in a flow table in a switch (SW) have been configured by the SC for a user flow from the UE based on information provided by the OCS, e.g., according to steps 502, 504, 506, 508, 510, 512, 514, 516, 518, and 520 shown in FIG. 5. However, the SC does not provide resource usage thresholds to the SW in the embodiment shown in FIG. 6. Instead, the SC stores the resource usage thresholds and monitors resource usage associated with the user flow based on information provided by the SW. In some embodiments, the CCA may store the resource usage thresholds and perform aspects of the method 600 described herein such as monitoring resource usage and providing resource usage alerts.

The UE transmits or receives packets from the SW at 602. The SW monitors the transmitted packets and received packets and gathers charging information based on the user flow's entry in the flow table. For example, the SW may count the bytes, count the packets, or measure the elapsed time for the user flow. The information may be stored in a field of the flow table. The SW periodically and autonomously provides reports based on the gathered information to the SC at 604, 606, 608. The SC uses the provided information to keep track of resource usage for the user flow. At 610, the SC determines that one or more of the resource usage thresholds established by the OCS has been exceeded. The SC provides a resource usage alert to the CCA (at 612) in response to the resource usage threshold being exceeded and the alert is forwarded to the OCS at 614. Some embodiments of the resource usage alert may include information indicating a packet count, a byte count, or an elapsed time for the user flow.

The OCS may selectively re-authorize the UE based on subscription or payment information available to the OCS. The SC may therefore wait for a message from the CCA indicating that the OCS has re-authorized the UE in response to receiving the resource usage alert. If the re-authorization message does not arrive before a predetermined time interval 616 elapses, the SC determines that the OCS has not re-authorized the UE. The OCS may then provide (at 618) a message instructing the SW to gate the user flow. The SW may gate the user flow (at 620) in response to the gating instruction so that the UE is unable to transmit over the SDN network or receive packets from the SDN network. In some embodiments, the UE may be able to transmit packets to the SW and the SW may store the packets pending subsequent re-authorization. Some embodiments of the SW may also store packets received from the SDN network for transmission to the UE pending subsequent re-authorization.

Figure 7:
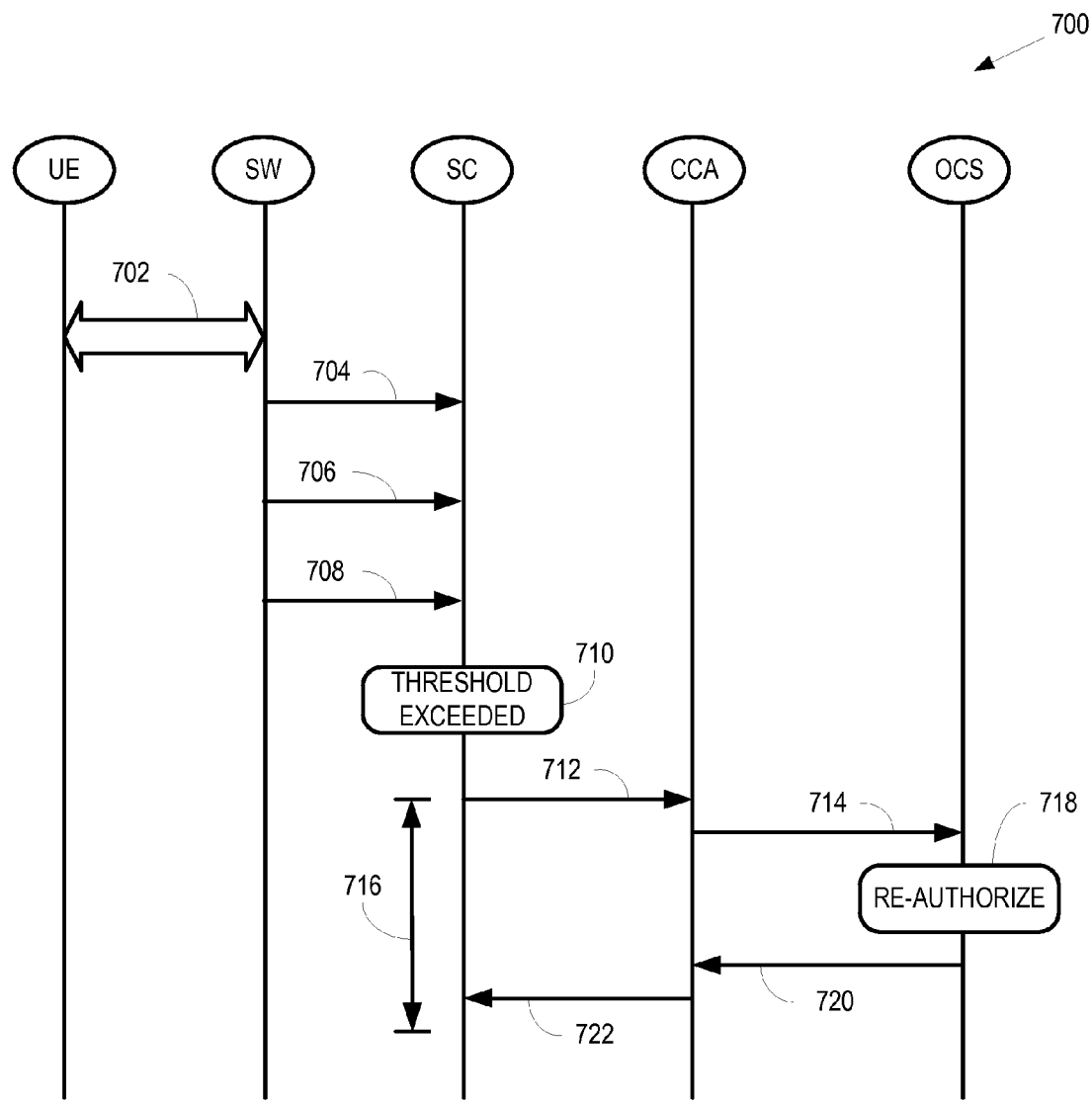
FIG. 7 is a flow diagram of a third method for online charging associated with a user flow in an SDN network according to some embodiments.

FIG. 7 is a flow diagram of a third method 700 for online charging associated with a user flow in an SDN network according to some embodiments. The SDN network includes a plurality of switches that implement data plane functionality and an SDN controller (SC) that implements control plane functionality for the plurality of switches. The SDN network also includes a charging control application (CCA) that may be implemented externally to the SC or as an integrated portion of the SC, as discussed herein. The SDN network further includes an online charging system (OCS). The method 700 may therefore be implemented in embodiments of the communication systems 100, 200, 400 shown in FIG. 1, FIG. 2, or FIG. 4, respectively. In the method 700, entries in a flow table in a switch (SW) have been configured by the SC for a user flow from the UE based on information provided by the OCS, e.g., according to steps 502, 504, 506, 508, 510, 512, 514, 516, 518, and 520 shown in FIG. 5. However, the SC does not provide resource usage thresholds to the SW in the embodiment shown in FIG. 7. Instead, the SC stores the resource usage threshold and monitors resource usage associated with the user flow based on information provided by the SW.

The UE transmits or receives packets from the SW at 702. The SW monitors the transmitted packets and received packets and gathers charging information based on the user flow's entry in the flow table. For example, the SW may count the bytes, count the packets, or measure the elapsed time for the user flow. The information may be stored in a field of the flow table. The SW periodically and autonomously provides reports based on the gathered information to the SC at 704, 706, 708. The SC uses the provided information to keep track of resource usage for the user flow. At 710, the SC determines that one or more of the resource usage thresholds established by the OCS has been exceeded. The SC provides a resource usage alert to the CCA (at 712) in response to the resource usage threshold being exceeded and the response is forwarded to the OCS at 714.

The OCS may selectively re-authorize the UE based on subscription or payment information available to the OCS. The SC may therefore wait for a message from the CCA indicating that the OCS has re-authorized the UE. In the illustrated embodiment, the re-authorization message arrives before a predetermined time interval 716 elapses. For example, the OCS re-authorizes the UE at 718. Re-authorization may include verifying subscription or payment information associated with the UE and determining new resource usage thresholds such as updated thresholds for the maximum number of bytes that can be consumed by the UE during the user flow, the maximum number of packets that can be consumed by the UE during the user flow, or the maximum duration of the user flow. Re-authorization information including the updated resource usage thresholds may then be provided to the CCA at 720, which may forward the authorization information to the SC at 722.

Since the SC received the re-authorization before the time interval 716 expired, the SC uses the re-authorization information provided by the OCS to generate updated resource usage thresholds. The SC may then continue to monitor resource usage associated with the user profiles based on the updated resource usage thresholds. In the illustrated embodiment, the SC has not informed the SW that the resource usage thresholds were exceeded and so the SW did not gate communication with the UE. Consequently, the user flow is not interrupted and proceeds normally during and after the re-authorization process.

Figure 8:
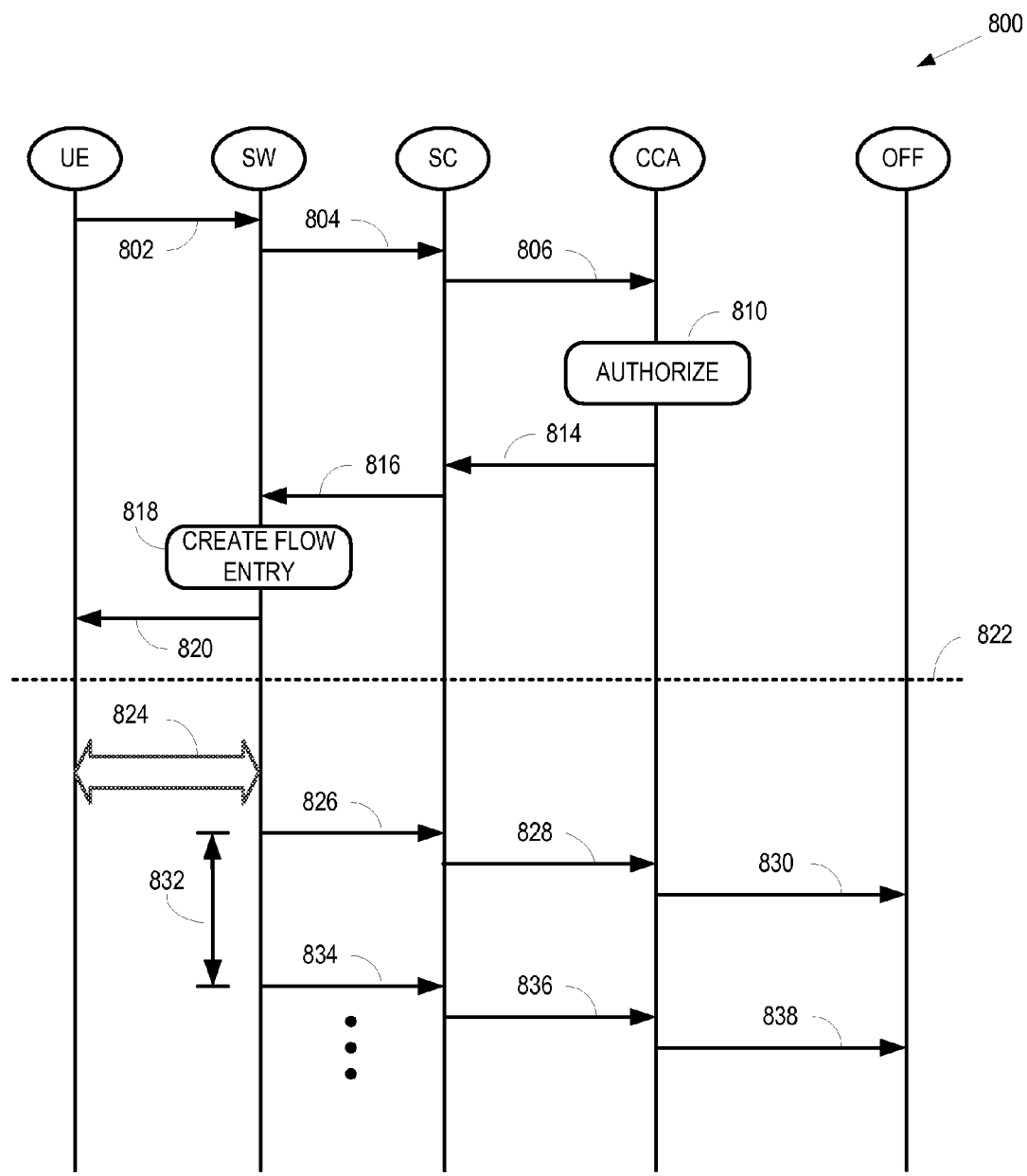
FIG. 8 is a flow diagram of a method for offline charging associated with a user flow in an SDN network according to some embodiments.

FIG. 8 is a flow diagram of a method 800 for offline charging associated with a user flow in an SDN network according to some embodiments. The SDN network includes a plurality of switches that implement data plane functionality and an SDN controller (SC) that implements control plane functionality for the plurality of switches. The SDN network also includes a charging control application (CCA) that may be implemented externally to the SC or as an integrated portion of the SC, as discussed herein. The SDN network further includes an offline charging system (OFF). The method 800 may therefore be implemented in embodiments of the communication systems 100, 200, 400 shown in FIG. 1, FIG. 2, or FIG. 4, respectively.

The method 800 may begin in response to user equipment (UE) transmitting (at 802) a packet to a switch (SW) to initiate a user flow in the SDN network. If there is no existing flow table entry in the SW the packet may be forwarded to the SC at 804, which communicates with the CCA at 806. In response to receiving the request, the CCA may, perhaps acting with other network functions, authorize off-line charging and determine the packet filter for off-line charging purposes at 810. Billing or charging for resource usage is performed off-line in the communication system and thus there is no need to establish resource usage thresholds, such as the resource usage thresholds implemented for online charging. Authorization for off-line charging does not involve the OFF. The CCA then forwards the authorization information (which may now include one or more flow filter parameters) to the SC at 814.

The SC uses the authorization information provided by the CCA to generate information that is used to configure the SW to collect and report the charging information associated with the requesting user flow. The information is provided to the SW at 816 and then the SW uses the information to create a flow entry in a flow table. The flow entry is associated with the user flow and can be programmed to collect information such as byte counts, packet counts, or elapsed time, as discussed herein. The flow entry may also store information indicating that the SW is to autonomously provide the collected charging information to the SC. In some embodiments the flow entry may also indicate a reporting period or predetermined time interval between transmissions of the reports. The SW may signal the UE at 820 to indicate that the requested user flow has been authorized. At this point, indicated by the line 822, the UE is authorized for communication in the SDN network and may begin transmitting or receiving packets.

The UE transmits or receives packets from the SW at 824. The SW monitors the transmitted and received packets and gathers charging information based on the user flow's entry in the flow table. For example, the SW may count the bytes, count the packets, or measure the elapsed time for the user flow. The information may be stored in a field of the flow table, as discussed herein. The SW generates a first report based on the gathered charging information and provides the report to the SC at 826. The report (or another message that includes the charging information in the report) is forwarded to the CCA at 828 which adds metadata associated with the flow to form Charging Data Records (CDRs), which are forwarded to the OFF at 830. The OFF may store the provided information for subsequent off-line charging of the user. The SW continues to gather charging information until the predetermined reporting time interval 832 has elapsed. The SW generates a second report based on the gathered charging information and provides the report to the SC at 834. The report (or another message that includes the charging information in the report) is forwarded to the CCA at 836 which adds metadata associated with the flow to form Charging Data Records (CDRs), which are forwarded to the OFF at 838, which may store the provided information. Periodic autonomous reporting of the gathered charging information may continue until the user flow with the UE is terminated or torn down.

Figure 9:
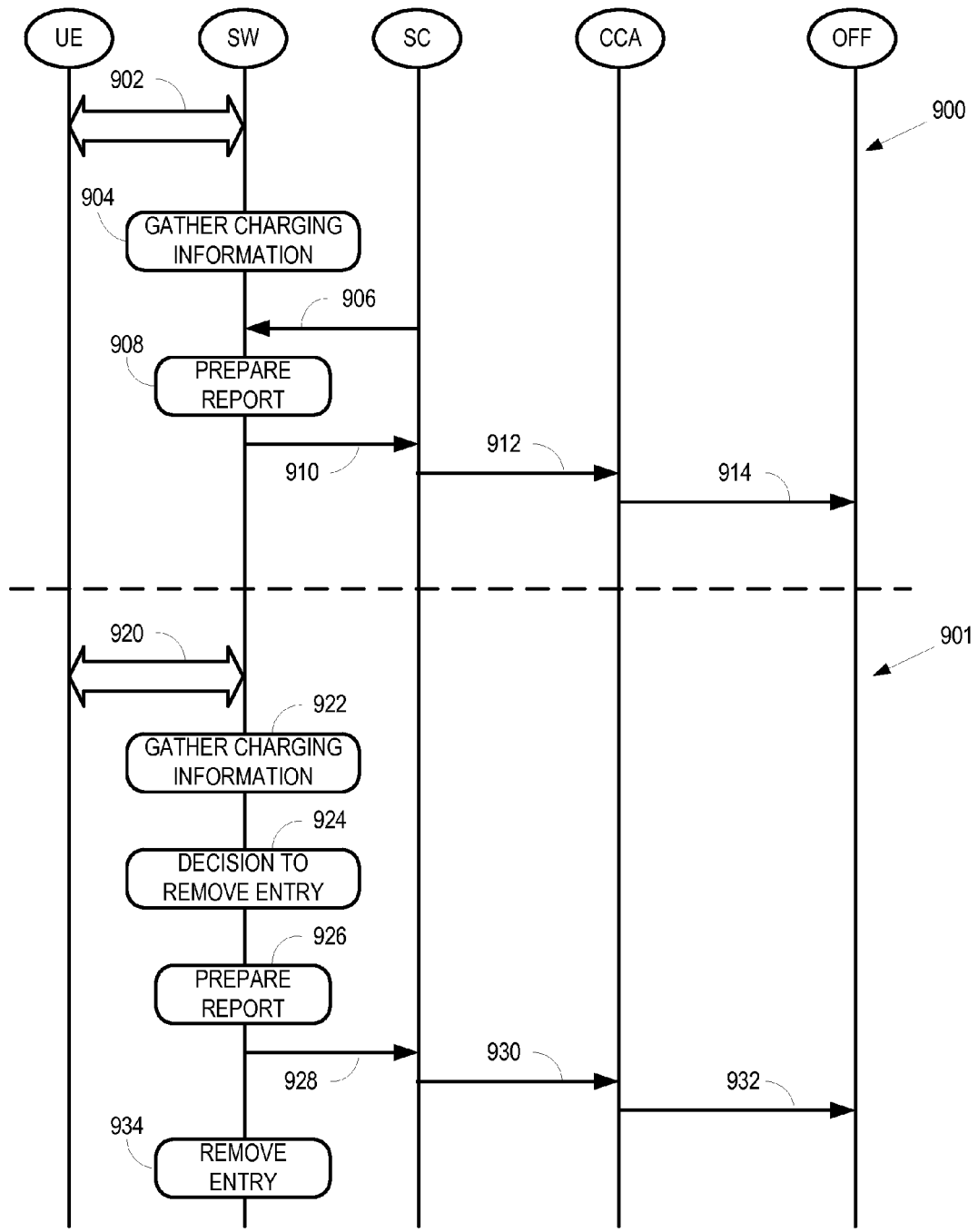
FIG. 9 is a flow diagram that illustrates a method for preparing charging information reports in response to a request and a method for preparing charging information reports in response to removing an entry in a flow table in an SDN network according to some embodiments.

FIG. 9 is a flow diagram that illustrates a method 900 for preparing charging information reports in response to a request and a method 901 for preparing charging information reports in response to removing an entry in a flow table in an SDN network according to some embodiments. The SDN network includes a plurality of switches that implement data plane functionality and an SDN controller (SC) that implements control plane functionality for the plurality of switches. The SDN network also includes a charging control application (CCA) that may be implemented externally to the SC or as an integrated portion of the SC, as discussed herein. The SDN network further includes an offline charging system (OFF). The method 900 may therefore be implemented in embodiments of the communication systems 100, 200, 400 shown in FIG. 1, FIG. 2, or FIG. 4, respectively. In the methods 900 and 901, entries in a flow table in a switch (SW) have been configured by the SC for a user flow from the UE based on information provided by the CCA, e.g., according to steps 802, 804, 806, 810, 814, 816, 818, and 820 shown in FIG. 8.

In the method 900, the UE transmits or receives packets from the SW at 902. The SW monitors the transmitted and received packets and gathers charging information at 904 based on the user flow's entry in the flow table. For example, the SW may count the bytes, count the packets, or measure the elapsed time for the user flow. The information may be stored in a field of the flow table, as discussed herein. The SC sends a request for the collected charging information to the SW at 906. In response to receiving the request, the SW prepares a report including the collected charging information at 910. The SW transmits the report to the SC at 912. The charging information in the report is then forwarded to the CCA at 914 which adds metadata associated with the flow to form Charging Data Records (CDRs), which are forwarded to the OFF at 916.

In the method 901, the UE transmits or receives packets from the SW at 920. The SW monitors the transmitted and received packets and gathers charging information at 922 based on the user flow's entry in the flow table. For example, the SW may count the bytes, count the packets, or measure the elapsed time for the user flow. The information may be stored in a field of the flow table, as discussed herein. The SW decides to remove the entry in the flow table for the user flow at 924. For example, the SW may decide to remove the entry because there are no longer packets flowing between the UE and the SW, or in response to a request from the SC to terminate the user flow. In response to deciding to remove the entry, the SW prepares a report including the collected charging information at 926. The SW transmits the report to the SC at 928. The charging information in the report is then forwarded to the CCA at 930 which adds metadata associated with the flow to form Charging Data Records (CDRs), which are forwarded to the OFF at 932. The SW removes the entry at 934.

The embodiments shown in FIGS. 1-9 are not intended to be mutually exclusive. Some embodiments of communication systems may therefore combine different portions or aspects of the embodiments shown in FIGS. 1-9.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)). The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
a controller comprising a control plane charging system to:
determine, in response to a first user equipment initiating a user flow with a second user equipment, a route comprising a subset of a plurality of switches in a switch network;
store state information or metadata to associate the user flow with an application, a user, a device, or a service;
define a filter for the user flow based on the state information or metadata; and
configure data plane charging systems in the subset to forward packets along the route from the first user equipment to the second user equipment, gather charging information for the user flow based on the filter, and provide the charging information to the controller.

2. The apparatus of claim 1, wherein the control plane charging system is to select one of the subset of the plurality of switches and to configure the selected switch to gather charging information for the user flow.

3. The apparatus of claim 2, wherein the data plane charging system comprises flow tables in each of the plurality of switches, and wherein the control plane charging system is to configure an entry in a flow table implemented in the selected switch, wherein the entry is associated with the user flow.

4. The apparatus of claim 3, wherein the control plane charging system is to configure the entry to at least one of: count packets in the user flow, count bytes in the user flow, and time the user flow.

5. The apparatus of claim 4, wherein the control plane charging system is to configure the data plane charging system in the selected switch to gate the user flow in response to a packet count, a byte count, or a time interval exceeding a corresponding threshold value.

6. The apparatus of claim 3, wherein the control plane charging system is to configure the entry to autonomously provide a packet count, a byte count, or a time interval to the controller.

7. The apparatus of claim 3, wherein the control plane charging system is to configure the entry to provide a packet count, a byte count, or a time interval to the controller in response to the packet count the bytes count, or the time interval reaching or exceeding a threshold.

8. The apparatus of claim 3, further comprising:
a charging control application to report the charging information to at least one of an online charging system or an off-line charging system.

9. A method comprising:
configuring, based on signals provided by a controller comprising a control plane charging system, data plane charging systems in a subset of a plurality of switches to forward packets for a user flow along a route including the subset of the plurality of switches, gather charging information for the user flows based on filters defined by state information or metadata that associate the user flow with an application, a user, a device, or a service, and provide the charging information to the controller, wherein the route is determined by the controller in response to user equipment initiating the user flow.

10. The method of claim 9, wherein configuring the data plane charging system comprises configuring a switch selected from the plurality of switches by the controller to gather charging information for the user flow.

11. The method of claim 10, wherein the data plane charging system comprises flow tables in the plurality of switches, and wherein configuring the data plane charging system comprises configuring an entry in a flow table implemented in the selected switch and associating the entry with the user flow.

12. The method of claim 11, wherein configuring the entry comprises configuring the entry to count packets in a first user flow, counting bytes in the first user flow, or time the first user flow.

13. The method of claim 12, wherein configuring the data plane charging system comprises configuring the data plane charging system in the selected switch to gate the user flow in response to a packet count, a byte count, or a time interval exceeding a corresponding threshold value.

14. The method of claim 12, wherein configuring the entry comprises configuring the entry to autonomously provide a packet count, a byte count, or a time interval to the controller.

15. The method of claim 12, wherein configuring the entry comprises configuring the entry to provide a packet count, a byte count, or a time interval to the controller in response to the packet count, the byte count, or the time interval exceeding a threshold.

16. A method comprising:
receiving, at data plane charging system in a switch of a plurality of switches controlled by a controller comprising control plane charging system, information to configure the switch to gather charging information for a user flow involving a first user equipment and a second user equipment, wherein the information comprises a filter defined by state information or metadata that associate the user flow with an application, a user, a device, or a service;
forwarding packets in the user flow along a route determined by the controller in response to the first user equipment initiating the user flow;
gathering charging information for the user flow based on the filter; and
providing the charging information to the controller.

17. The method of claim 16, further comprising:
configuring an entry in a flow table in the switch based on the information received from the controller.

18. The method of claim 16, wherein gathering the charging information for the user flow comprises at least one of counting packets associated with the user flow, counting bytes associated with the user flow, and timing the user flow.

19. The method of claim 18, further comprising:
gating the user flow in response to a packet count, a byte count, or a time interval exceeding a corresponding threshold value.

* * * * *